USO05782206A

United States Patent [19]
Markowitz

[11] Patent Number: 5,782,206
[45] Date of Patent: Jul. 21, 1998

[54] LITTER BOX HAVING A GROOMING DEVICE

[76] Inventor: Eli Markowitz, 1173 52nd St., Brooklyn, N.Y. 11219

[21] Appl. No.: 179,044

[22] Filed: Jan. 7, 1994

[51] Int. Cl.[6] .................................................. A01K 1/035
[52] U.S. Cl. ............................ 119/622; 119/501; 119/484; 119/664; 119/165; 119/661
[58] Field of Search ................................ 119/83, 85, 28.5, 119/156, 157, 158, 159, 15, 17, 19, 161, 165, 482, 483, 484, 501, 622, 627, 612, 616, 664, 660, 661

[56] References Cited

U.S. PATENT DOCUMENTS

| 1,546,898 | 7/1925 | Hinken | 119/157 |
| 4,301,766 | 11/1981 | Pilloni | 119/83 |
| 4,350,198 | 9/1982 | Naegeli | 119/19 |
| 4,938,169 | 7/1990 | Barmakian | 119/15 |

FOREIGN PATENT DOCUMENTS

| 461582 | 6/1928 | Germany | 119/83 |
| 3425300 | 1/1986 | Germany | 119/86 |
| 103157 | 11/1922 | Switzerland | 119/17 |
| 887060 | 1/1962 | United Kingdom | 119/157 |
| 893224 | 4/1962 | United Kingdom | 119/157 |

*Primary Examiner*—Todd E. Manahan
*Attorney, Agent, or Firm*—Malina & Wolson

[57] ABSTRACT

A litter box includes a pair of brushes each of which has bristles which project into an opening through which an animal must pass in order to enter or leave the litter box thereby performing a grooming action on the coat of the animal. In an additional embodiment of the invention, a sponge member is provided which deposits a liquid on the coat of the animal as the animal enters or leaves the litter box. In another embodiment of the invention the animal enters a second enclosure in which a washing action is performed on the animal's body and paws.

15 Claims, 16 Drawing Sheets

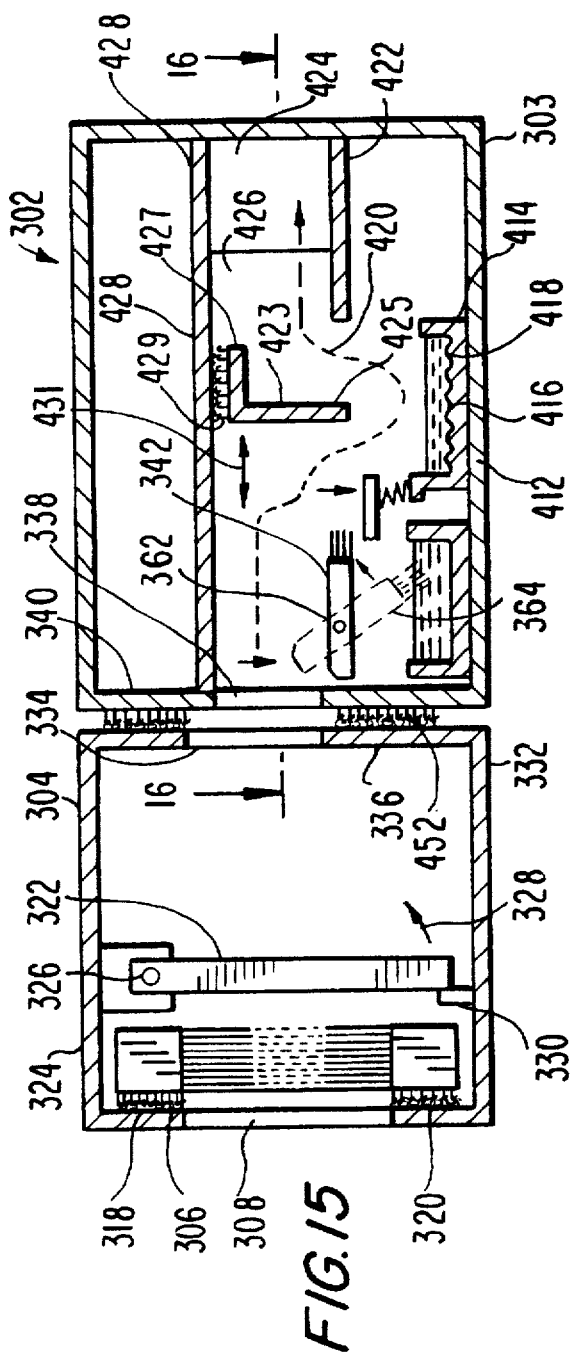
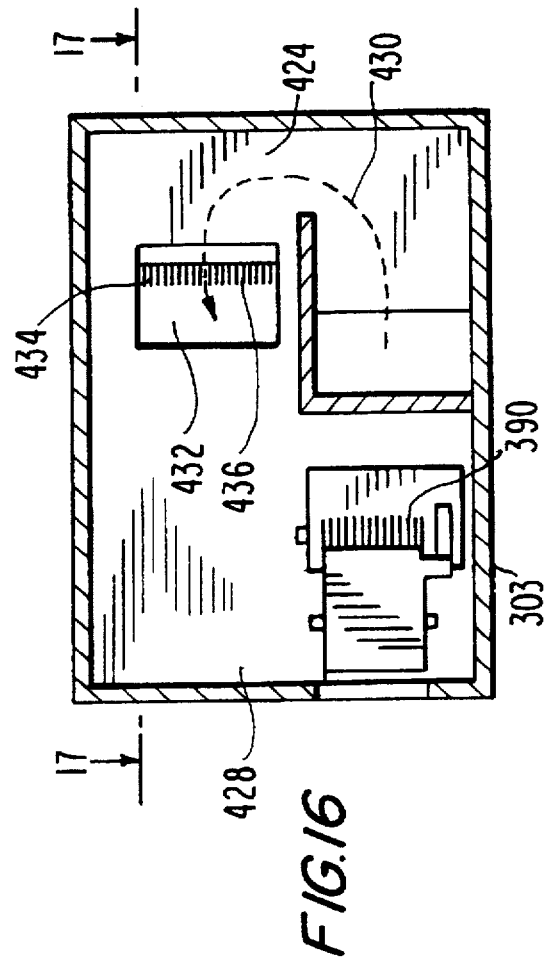
FIG.15
FIG.16

5,782,206

1

LITTER BOX HAVING A GROOMING DEVICE

BACKGROUND OF THE INVENTION

The present invention relates generally to litter boxes used by cats and more particularly to a litter box apparatus which incorporates brushes for grooming and hair removal as well as washing apparatus to promote cleanliness.

While the prior art related to litter boxes for pet cats and similar animals includes various examples of containers which have a variety of devices which facilitate maintaining a pet cat indoors, there remains a need for an apparatus which will aid in grooming the cat to remove loose hairs and dirt from the cat's fur as well as provide a means for cleaning the cat after the cat leaves the area of the litter.

OBJECTS AND SUMMARY OF THE INVENTION

It is an object of the present invention to provide a litter box apparatus which incorporates a grooming brush which grooms the cat upon entry and upon leaving the litter box.

Another object of the present invention is to provide a litter box apparatus which incorporates adjustable grooming brushes which may be adjusted to accommodate various sizes of pets.

Another object of the invention is to provide a litter box apparatus which incorporates a washing apparatus to wash both the body and the paws of a cat.

Another object of the present invention is to provide a litter box apparatus in which a cat must proceed through a washing process in order to leave the apparatus.

Another object of the present invention is to provide a litter box apparatus which can dispense a liquid onto the fur of an animal.

Yet another object of the present invention is to provide a litter box apparatus which includes a relatively small number of component parts which results in a relatively low overall cost.

The foregoing and other objects and advantages of the invention will appear more clearly hereinafter.

In accordance with the present invention there is provided a litter box apparatus which includes an enclosure. The front panel of the enclosure has an opening through which an animal passes in order to use the litter, which is provided within the enclosure. A pair of brushes is provided each of which has bristles which project into the opening thereby performing a grooming and cleaning action on the coat of the animal as the animal enters or leaves the enclosure. The brushes are mounted on the front panel using a hook and loop type of fastener which facilitates adjustment of the opening formed by the ends of the bristles in order to accommodate animals of various sizes.

In an additional embodiment of the invention, four brushes are provided in a rectangular frame configuration with each of the brushes having bristles which project into the opening in order to provide grooming for all portions of the animal's coat. The brushes are connected by removable connectors enabling one or more of the brushes to be removed when desired.

A sponge member is mounted proximate to the brushes and a container dispenses liquid onto the sponge member. The liquid may be medicinal, cleansing or oil and the sponge member includes an aperture through which the animal must pass thereby coating the animal with the liquid.

2

In an additional embodiment the animal is forced to leave the enclosure via a second enclosure which contains a washing assembly. The enclosure includes a one-way door which forces the animal to enter the second enclosure and step onto a pivoting plate which includes a brush which normally projects into a pan of washing fluid. As the animal steps onto the pivoting plate, the plate swings into a horizontal position and is latched in place. As the animal leave the pivoting plate, the brush wipes the animal and the animal then jumps onto a trigger plate which releases a latch allowing the brush on the pivoting plate to again project into the pan of washing fluid. The animal then jumps into a pan of washing fluid which washes the animal's paws. The animal then moves through a passageway which includes a second brush for wiping the animal and a pad for drying the animal's paws.

DESCRIPTION OF THE DRAWINGS

Other important objects and advantages of the invention will be apparent from the following detailed description taken in conjunction with the accompanying drawings in which:

FIG. 15 is a cross-sectional view taken along the line 15—15 of FIG. 14;

FIG. 16 is a cross-sectional view taken along the line 16—16 of FIG. 15;

DETAILED DESCRIPTION OF THE INVENTION

Figure 1:
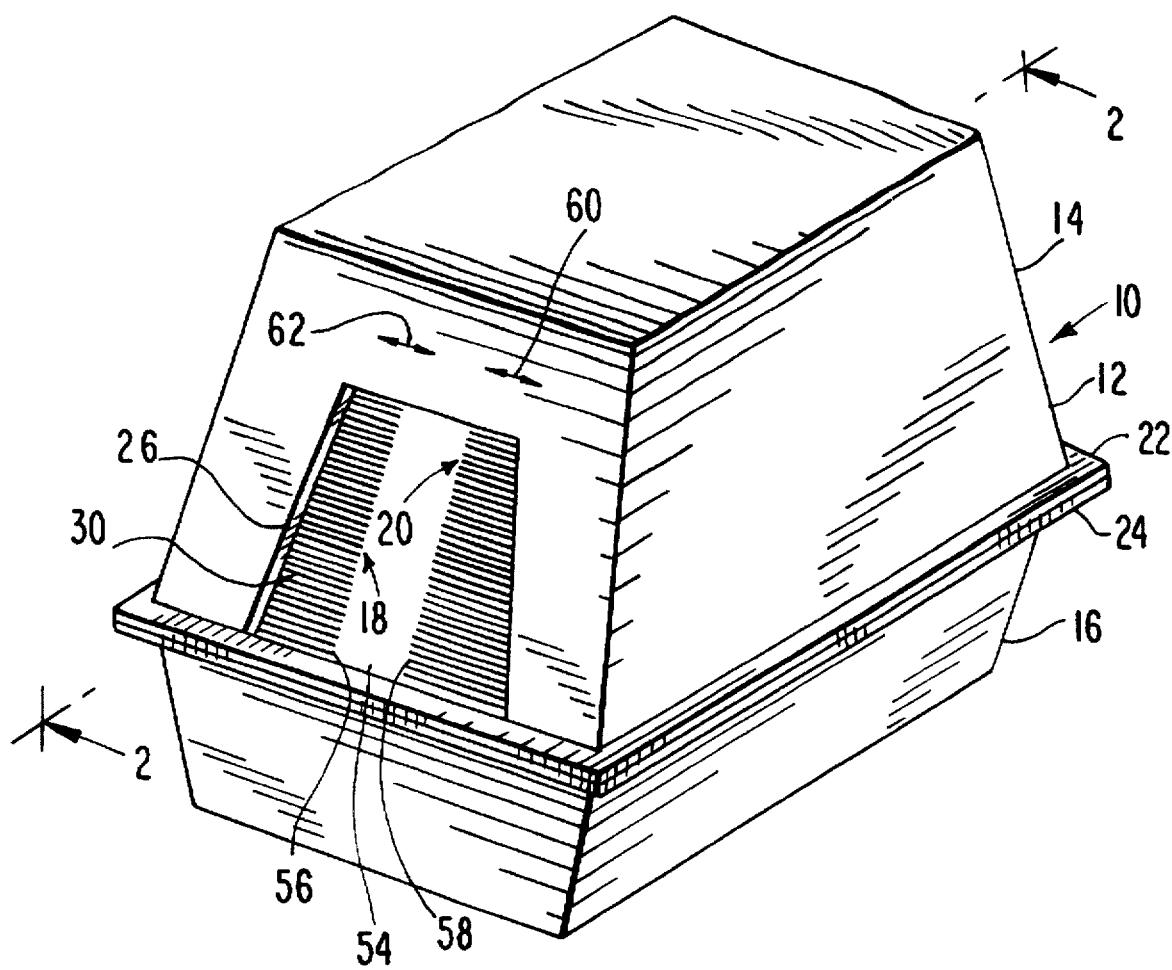
FIG. 1 is an overall perspective view of a litter box apparatus according to the present invention.
Figure 2:
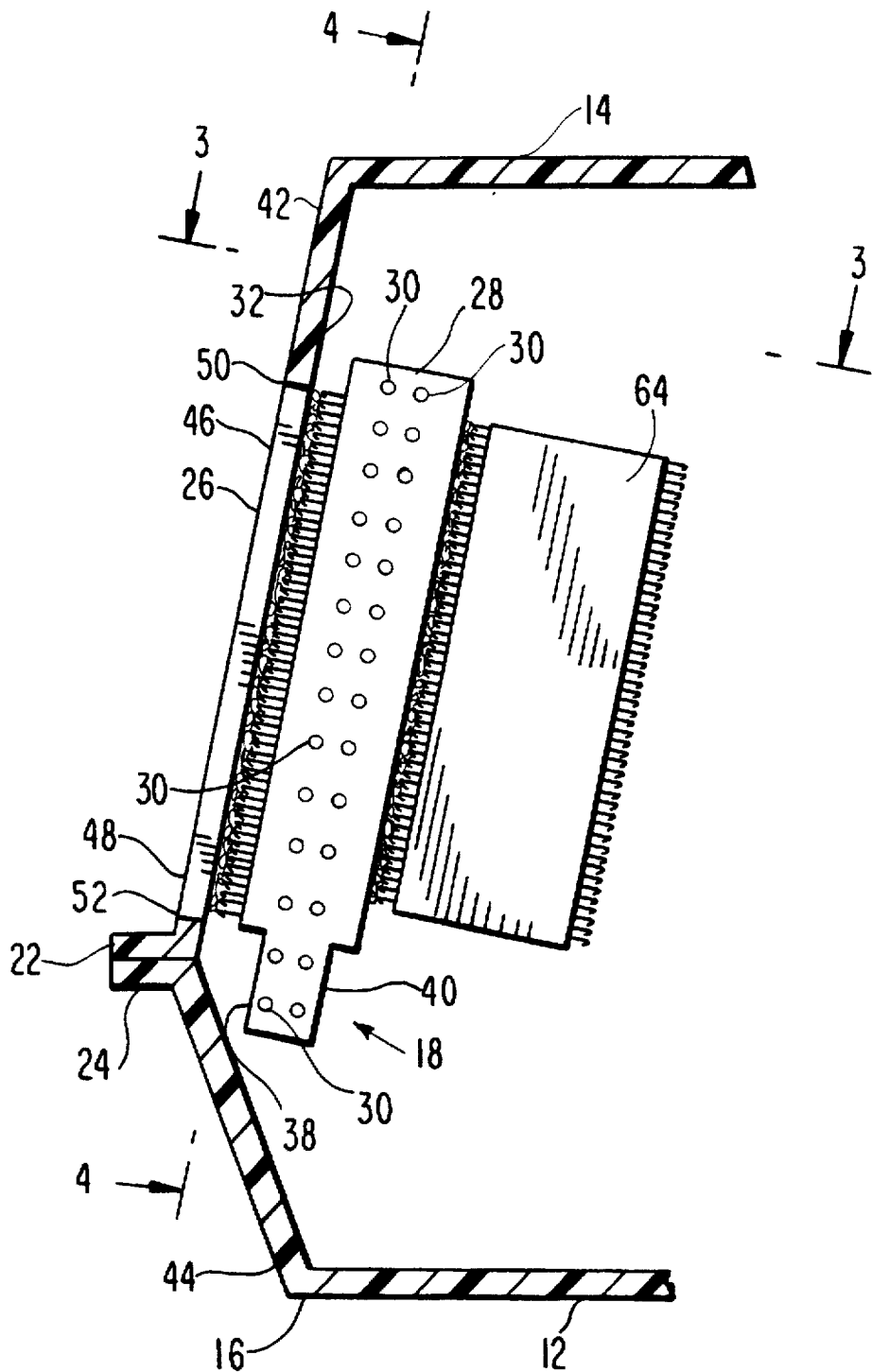
FIG. 2 is a cross-sectional view taken along the line 2—2 of FIG. 1.
Figure 3:
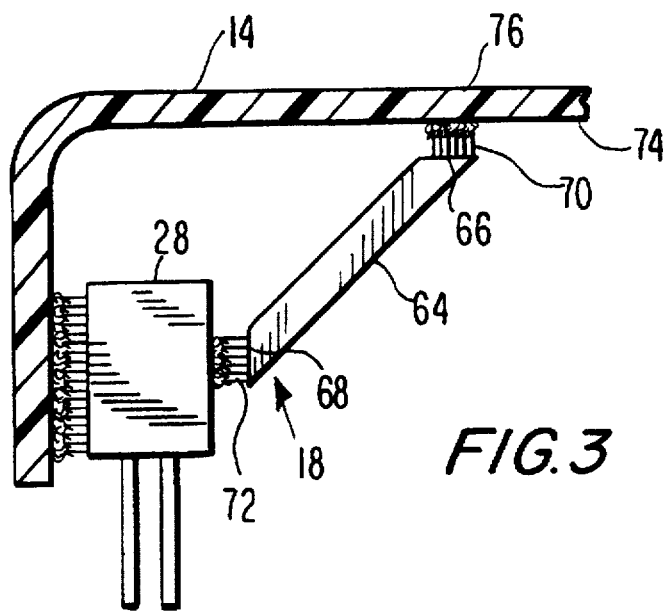
FIG. 3 is a cross-sectional view taken along the line 3—3 of FIG. 2.
Figure 4:
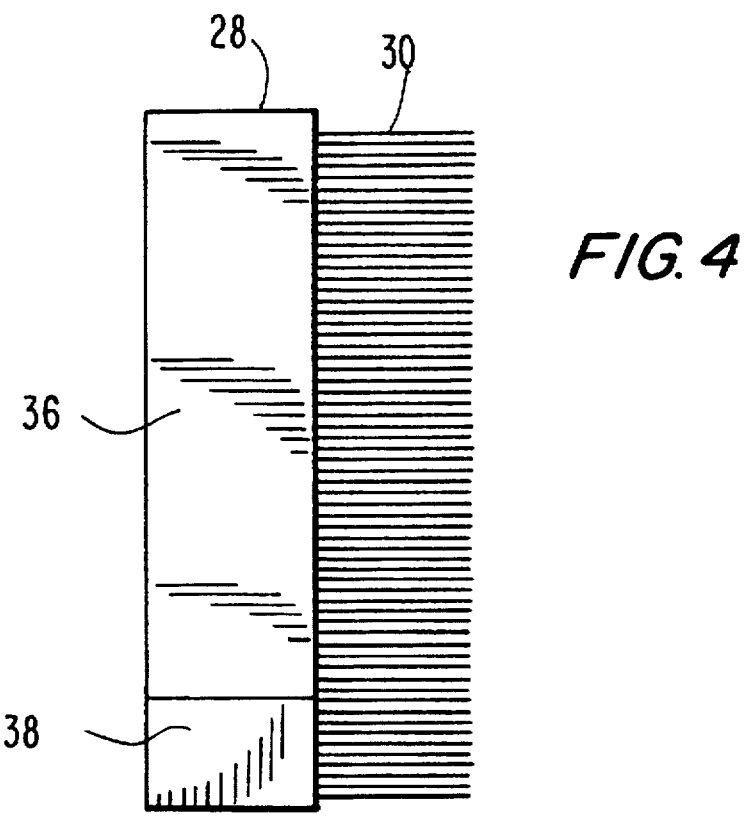
FIG. 4 is an elevation view of a brush according to the present invention with the view taken along the line 4—4 of FIG. 2.
Figure 5:
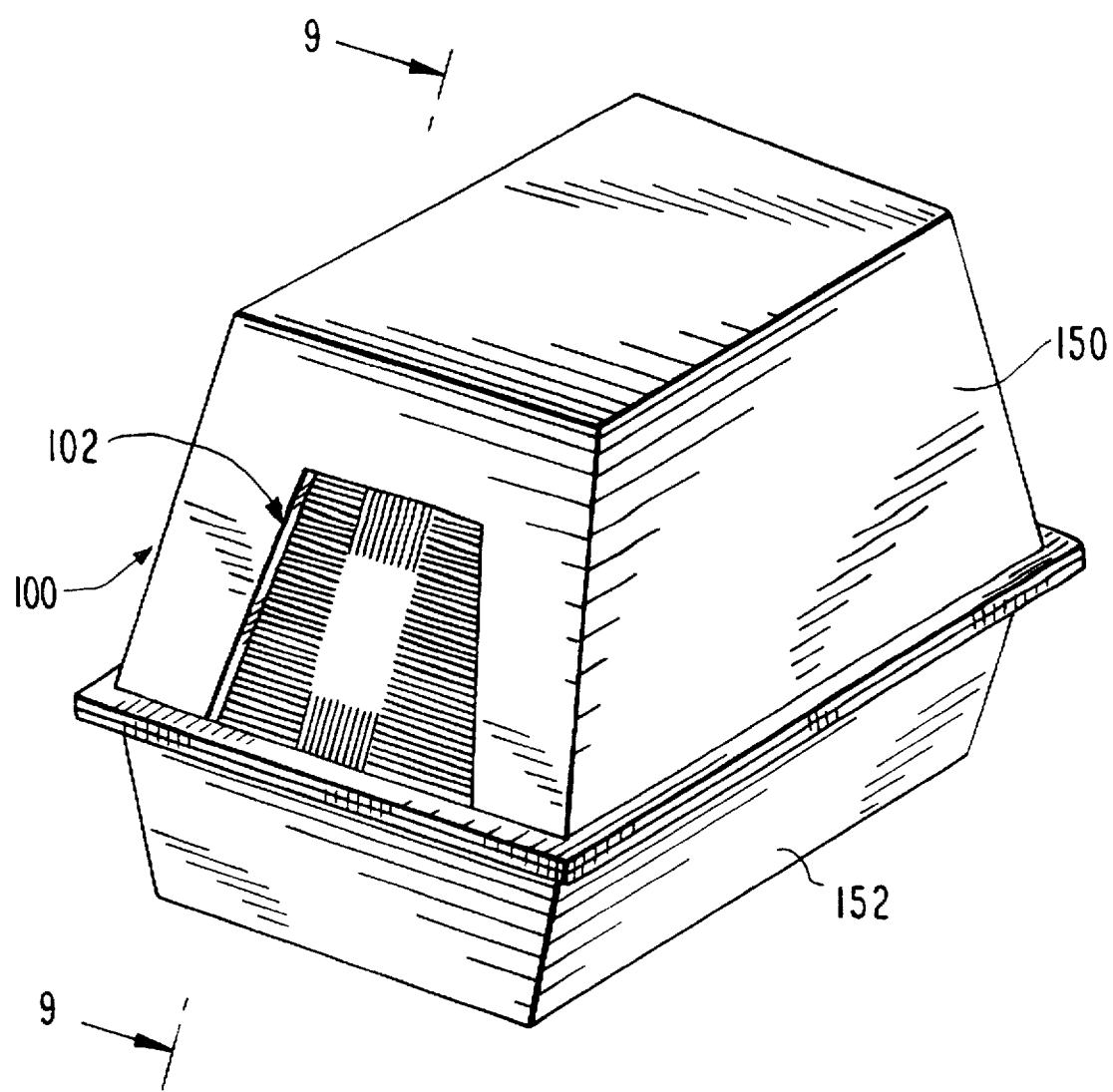
FIG. 5 is an overall perspective view of a first alternative embodiment of the apparatus of FIG. 1.

With the reference to the drawings there is shown in FIG. 1 a litter box apparatus 10, made in accordance with the present invention which includes a litter box 12 having a cover 14, a lower member 16, and a pair of brush assemblies 18, 20 one of which is shown in detail in FIGS. 2–4. The litter box 10 is, according to the present invention, suitable for, but not limited to, cats, dogs and other similar pet animals.

The lower member 16 of the litter box 12 forms a receptacle which contains litter in a conventional manner. The lower member 16 and the cover 14 may be attached along the integrally formed rims 22,24 using any one of a number of conventional fasteners which are not shown. The cover 14 has an opening 26 which cooperates with the brush assemblies 18, 20 in a manner which will be presently described.

The brush assembly 18 shown in FIGS. 2–4 includes a base 28 which may be formed of wood or plastic or other similarly suitable material and a plurality of bristles 30 which project into the opening 26 in the cover 14 as is shown in FIG. 1. The base 28 of the brush assembly 18 is attached to the inside surface 32 of the cover 14 by a hook and loop fastener of the type sold under the trademark VELCRO. The hook and loop fastener 34 is attached to the base 28 of the brush assembly 18 in the area designated by the reference numeral 36 in FIG. 4. The base 28 includes a pair of step portions 38, 40 the purpose of which will become clear when viewed as shown in FIG. 2.

As shown in FIG. 2, the base 28 is attached to the inside surface of the cover 14. The step portion 38 projects downward toward the lower member 16 and supports the bristles 30 as does the entire base 28. The step portion 38 allows the brush assembly 18 to adapt to a wide variety of litter boxes 12 which may have a range of angular relationships between the front portion 42 the cover 14 and the front portion 44 of the lower member 16 and still provide support for bristles 30 which completely cover both the upper portion 46 and the lower portion 48 of the opening 26. As is shown in FIG. 2, this full coverage is ensured since the bristles 30 actually extend slightly past the top 50 and the bottom 52 of the opening 26 in the cover 14. The opening 54 between the ends of the bristles 56, 58 as shown in FIG. 1 may be increased or decreased by adjusting the position of the brush assemblies 18, 20 relative to the opening 26 in the cover 14 in the directions shown by the arrows 60, 62 in FIG. 1.

This adjustment enables the apparatus 10 according to the present invention to accommodate animals of different sizes.

As is shown typically in FIGS. 2 and 3 the brush assembly 18 includes a brace member 64 which has angled end surfaces 66, 68 on which hook and loop fasteners 70, 72 are attached. The hook and loop fasteners 70, 72 on the brace member 64 attach the brace member 64 to base 28 and to the inner surface 74 of the side wall 76 of the cover 14 to add additional stability to the brush assembly 18. The brace member 64 may be removed when such additional stability is not required. It should be understood that the construction of the brush assembly 20 is the same as the construction of the brush assembly 18 as described above.

FIGS. 5–9 show an alternative embodiment 100 of the invention in which the brush assembly 102 includes four brush members 104, 106, 108, 110 and four connection members 112, 114, 116, 118. The brush assembly 102 facilitates a grooming action on the upper and lower portions of the animal by means of the brush members 104, 108 as well as on the sides of an animal by means of the brush member 106, 110. The bases 120, 122, 124, 126 of the brush member 104, 106, 108, 110 each have a pair of receptacle portions shown typically by the receptacle portions 128 130 in FIG. 8, and the connector members 112, 114, 116, 118 each have a pair of projecting portions which removably fit into the receptacles 128, 130 as shown typically by the projecting portions 132, 134 of the connector members 112, 114.

Figure 7:
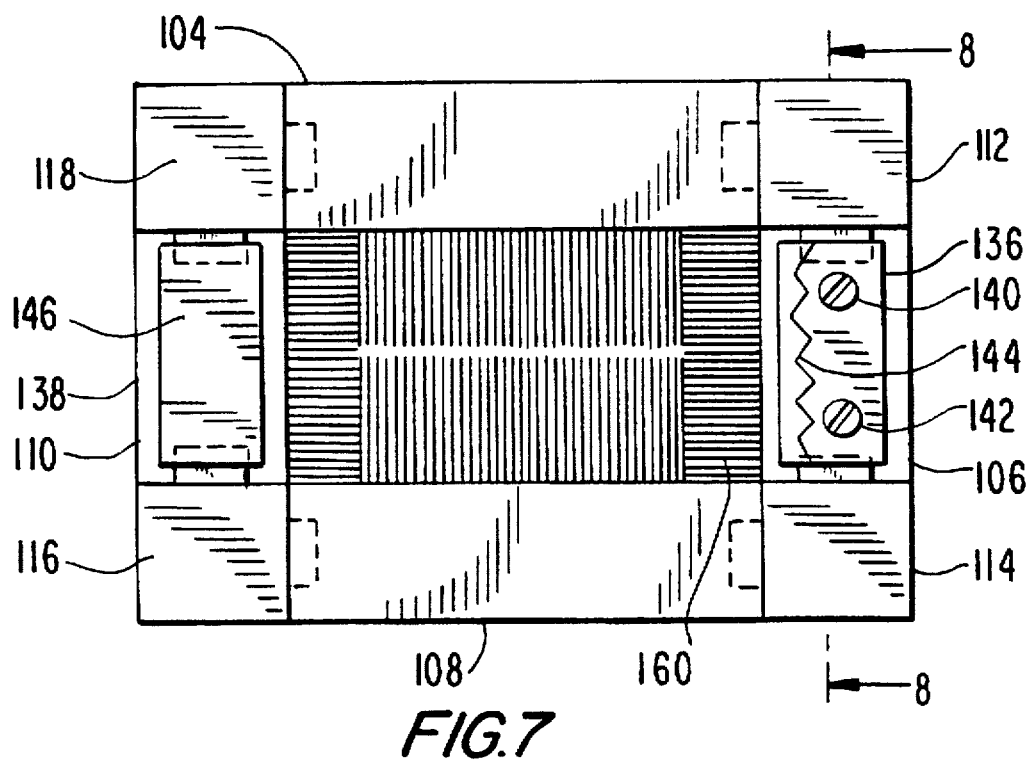
FIG. 7 is an elevation view showing the brushes of FIG. 6 in an assembled condition with one of the hook and loop fastener pads shown broken away to reveal two screw fasteners.
Figure 8:
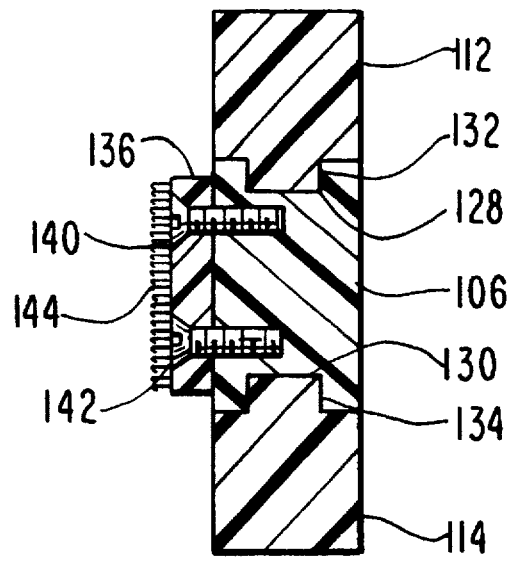
FIG. 8 is a cross-sectional view taken along the line 8—8 of FIG. 7.

The two vertical brush members 106, 110 each include a plate 136, 138 which is attached to the bases 122, 126 by means of flat head screws which are illustrated typically by the screws 140, 142 in FIGS. 7 and 8. The plates 136, 138 are each covered by a hook and loop fastener panel 144, 146 one of which panels 144 has been shown partially broken away in FIG. 7 to reveal the screws 140, 142.

Figure 9:
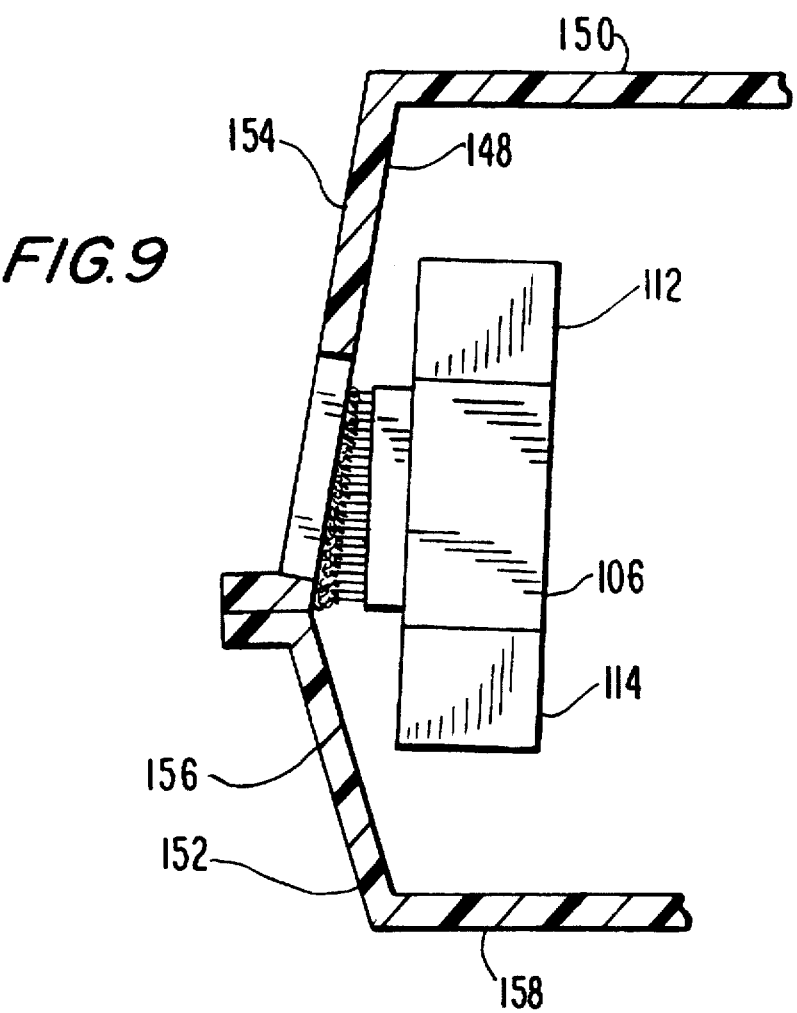
FIG. 9 is fragmentary a cross-sectional view taken along the line 9—9 of FIG. 5.

FIG. 9 shows the brush assembly 102 mounted on the inside surface 148 of the cover 150 of the litter box 152. The plate 136 functions in a manner similar to the step portion 38 of the brush assembly 18 in FIG. 2 and as shown in FIG. 9 the upper 104 and lower 108 horizontal brush members are mounted on the two vertical brush members 106, 110. The vertical brush members 106, 110 are mounted on the inside surface 148 of the top cover 158. This arrangement which requires attachment only of the vertical brush members 106, 108 to the cover 150 allows the brush assembly 102 to accommodate various litter boxes 152 in which there may be a range of angular relationships between the front surface 154 of the cover 150 and the front surface 156 of the lower members 158. The brush assembly 102 of FIGS. 5–9 allow the use of all four brush members 104, 106, 108, 110 as shown to provide grooming by the bristles 160 or the removal of one or both horizontal brush members 104, 108 in the event that grooming of the upper and lower portions of an animal is not desired. In addition, to removal of the horizontal brush members 104 108 one of the vertical brush members may be removed, if desired. The brush assembly 102 thus provides a degree of flexibility in the application of the grooming process which can accommodate an animal which may be ill or may have sores or other conditions on a portion of its body which should not be groomed.

FIGS. 10–13 show another embodiment of the invention 200 in which a brush assembly 202 incorporates a small container 204 for storage of a medicinal, cleansing, oiling or grooming liquid and a sponge 205 for application of the liquid.

Figure 10:
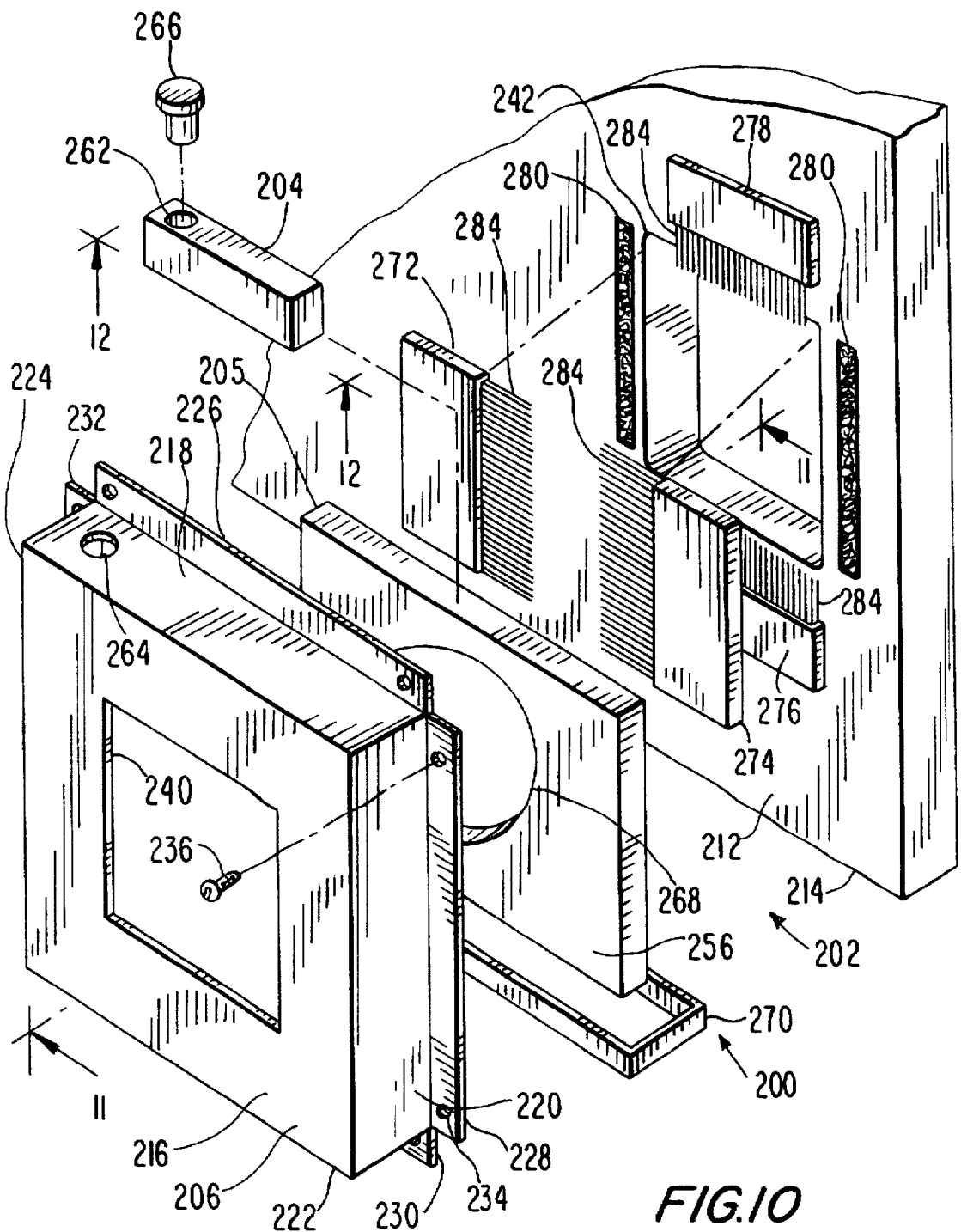
FIG. 10 is an exploded view showing another alternative embodiment of the apparatus of FIG. 1 with the apparatus shown mounted on a door.
Figure 11:
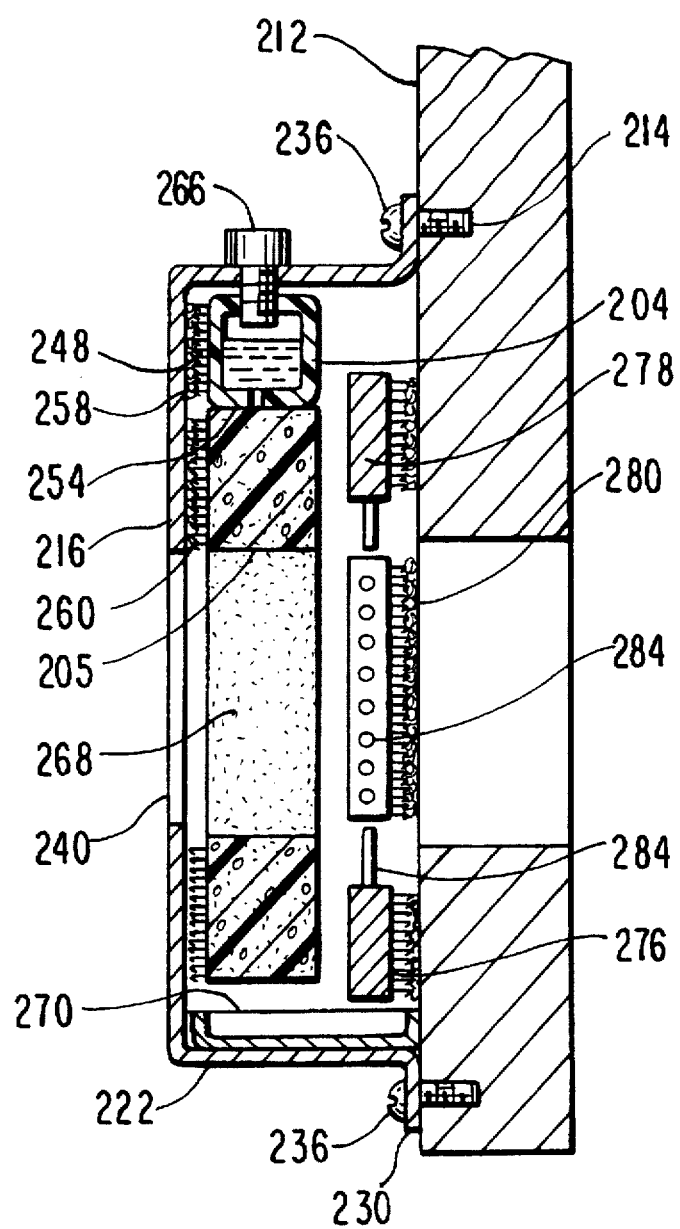
FIG. 11 is a cross-sectional view taken along the line 11—11 of FIG. 10.
Figure 13:
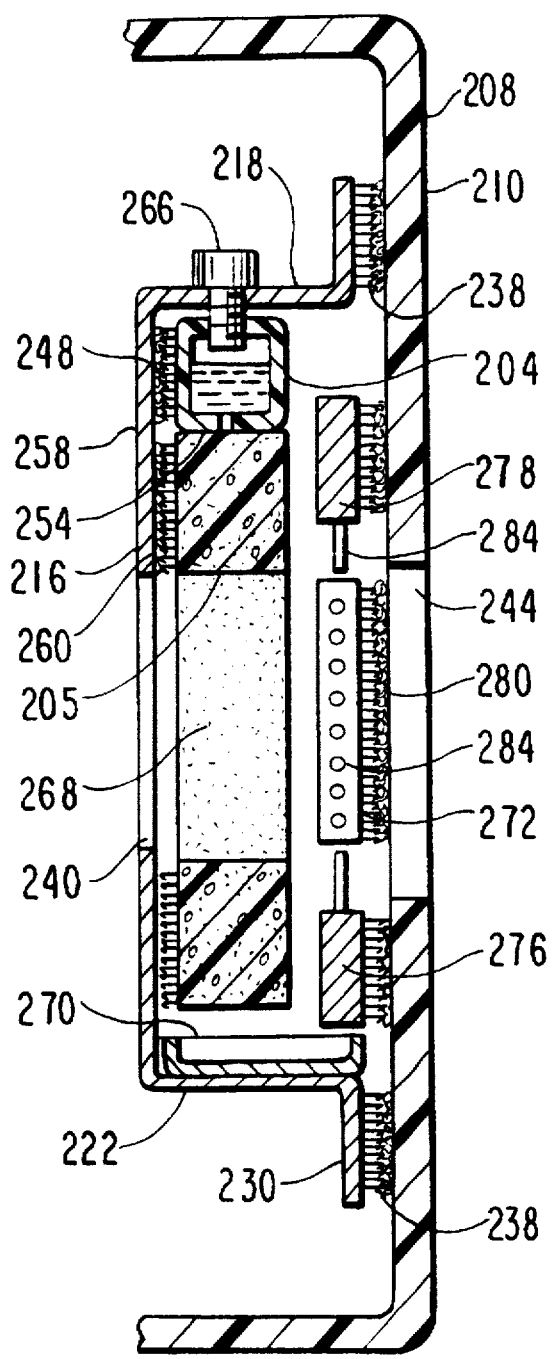
FIG. 13 is a cross-sectional view of the apparatus of FIG. 10 taken along the line 11—11 with the apparatus shown mounted on the inside of a litter box.

As is best shown in FIGS. 10 and 11, the embodiment 200 includes an enclosure 206 which may be mounted on the inside of the front surface 208 of a litter box 210 as is shown in FIG. 13 or on the inside surface 212 of a door 214 as is shown in FIGS. 10 and 11. The enclosure 206 includes a front panel 216 and four side panels 218 220, 222, 224 and four flange portions 226, 228, 230, 232 which are attached to the side panels 218, 220, 222, 224. The flange portion 226, 228 230, 232 include holes 234 which accept screws 236 as shown in FIGS. 10 and 11.

The flange portions 226, 228, 230, 232 also accept hook and loop fasteners 238 as shown in FIG. 13. The front panel 216 includes an opening 240 which corresponds to and is in general registry with an opening 242 formed in the door 214 or the opening 244 in the front 208 of the litter box 210.

Figure 12:
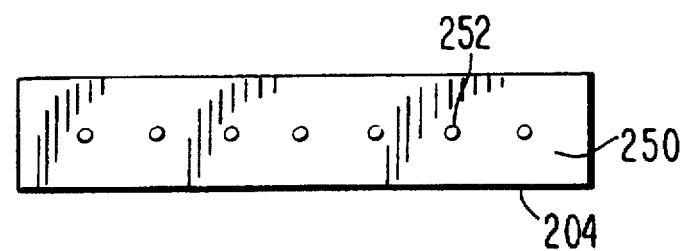
FIG. 12 is a view taken along the line 12—12 of FIG. 10 showing the bottom surface of the liquid container.
Figure 14:
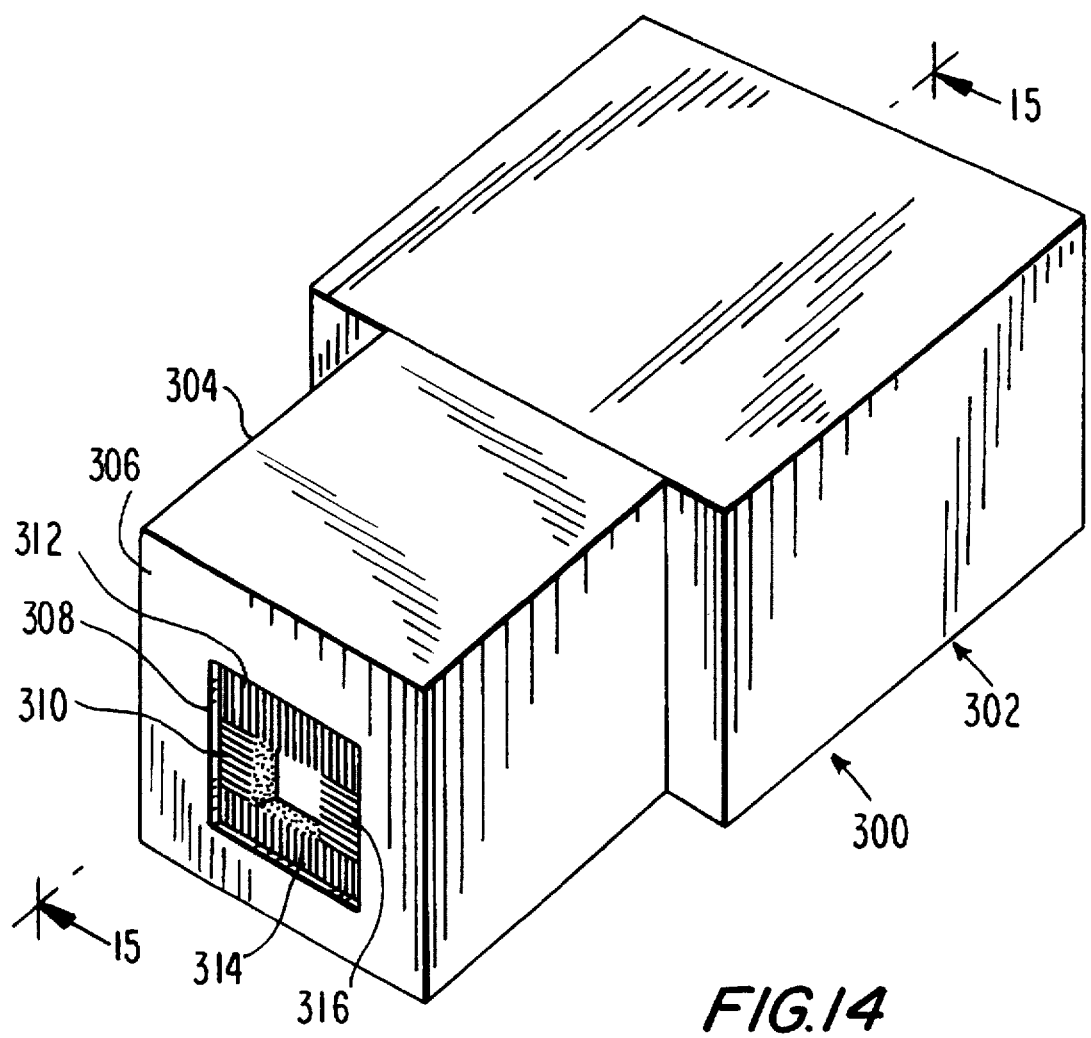
FIG. 14 is an overall perspective view of another embodiment of the apparatus of FIG. 1.

The container 204 is attached to the surface 258 of the front panel 216 by a hook and loop fastener 248 and the bottom surface 250 of the container 204 which has a plurality of small holes 252 as is shown in FIG. 12 is in contact with the top surface 254 of the sponge member 205. The front surface 256 of the sponge member 205 is attached to the surface 258 of the front panel 216 by the hook and loop fastener 260. The container 204 includes a fill port 262 in the side panel 218 of the enclosure 206 and a removable plug 266 is provided to seal the port. The sponge member 205 includes a central aperture 268 which is in general registry with the opening 240 in the front panel 216. A catch pan 270 is mounted on the panel 222 of the enclosure 206 to catch any fluid released from the sponge member 205 or from the animal as the animal passes through the aperture 268 and becomes coated with the liquid.

Four brushes 272, 274, 276, 278 are provided attached by the hook and loop fasteners 280 to the front surface 208 of the litter box 210 as shown in FIG. 13 or to the inside surface 212 of the door 214 as is shown in FIG. 10. The use of hook and loop fasteners 280 for attachment of the brushes 272, 274, 276, 278 allows adjustment of the opening formed by the brushes 284 to accommodate various size animals or the temporary removal of one or more brushes to accommodate the needs of individual animals as has been previously described.

FIGS. 14–20 show another embodiment 300 of the invention which includes a washing assembly 302. As in best shown in FIGS. 14 and 15. The embodiment 300 includes a litter box 304 the front panel 306 of which has an aperture 308. Four individual brushes 310, 312, 314, 316 are mounted on the inner surface 318 of the front panel 306 using hook and loop fasteners 320 in the manner previously described.

A pivotally mounted door 322 is mounted on the top 324 of the litter box 304 proximate to the brushes 310 312, 314, 316.

The door 322 is connection to the pivot 326 and is able to swing inward in the direction shown by the arrow 328 in FIG. 15 but is prevented from swinging in the opposite direction by the stop member 330 which is attached to the bottom 332 of the litter box 304. An animal which has entered the litter box 304 is thus prevented from exiting through the aperture 308 but must proceed through the opening 334 in the rear panel 336 of the litter box 304 and through the opening 338 in the front panel 340 of the washing assembly 302.

The washing assembly 302 has the general configuration of a rectangular enclosure 303 with internal panels as will be presently described. The animal which enters the washing assembly 302 through the opening steps onto a pivoting plate 342 which is supported by the pivot 362 and which is the position shown schematically in broken lines 364 in FIGS. 15 and 19. The weight of the animal pushes the end 366 of the plate 342 in the direction shown by the arrow 368 in FIG. 19 causing the end 370 of the plate 342 to pivot upward in the direction shown by the arrow 372. When the plate 342 reaches the horizontal position, the plate 342 is latched in the horizontal position by the latch member 374. The latch member 374 is slideably mounted in the guides 376, 378 and is biased in the direction shown by the arrow 380 in FIG. 19 by the compression spring 382. As the plate 342 swings toward the horizontal position, the bar 384 which is mounted on the plate 342 overrides the end 386 of the latch member 374 and the end of the latch member 374 then maintains the plate 360 in the horizontal position.

The end 388 of the plate 342 includes a brush 390 which wipes the animal as the animal passes the end 388 of the plate 342 and jumps onto the trigger plate 392. The trigger plate 392 is mounted on the pivot 394 and the weight of the animal acting in the direction shown by the arrow 396 in FIG. 19 acts to overcome the helical spring 398 which supports the end 400 of the trigger plate 392 and the end 402 of the arm 404, which is mounted on the trigger plate 392, bears on the sliding latch member 374 in the direction shown by the arrow 396 in FIG. 19 causing the latch member 374 to release the plate 342. The plate 342 pivots under the influence of gravity to return to the position shown in broken lines 364 in which the bristles 408 of the brush 390 are immersed in a pan 410 of washing fluid which is mounted on the bottom panel 412 of the washing assembly 302.

The animal then jumps off the trigger plate 392 and lands with its feet in a second pan 414 of washing fluid which is mounted on the bottom panel 412 of the washing assembly 302. The bottom 416 of the second pan 414 may preferably have a surface which has a plurality of undulations 418 or waves which urge the toes of the animal's paws to separate slightly thereby promoting entry of the washing fluid and thorough washing of the animal's paws. The path of the animal is shown in broken lines 420 in FIG. 15. The animal leaves the second pan 414 and jumps on the panel 422 and goes through the opening 424. The wall 423 has a vertical portion 425 and a horizontal portion 427. The horizontal portion 427 is attached to the panel 428 by a hook and loop fastener 429 and the wall 423 can be adjusted in the directions shown by the arrows 431 to accommodate different size animals to ensure adequate brushing action by the brush 390.

Figure 17:
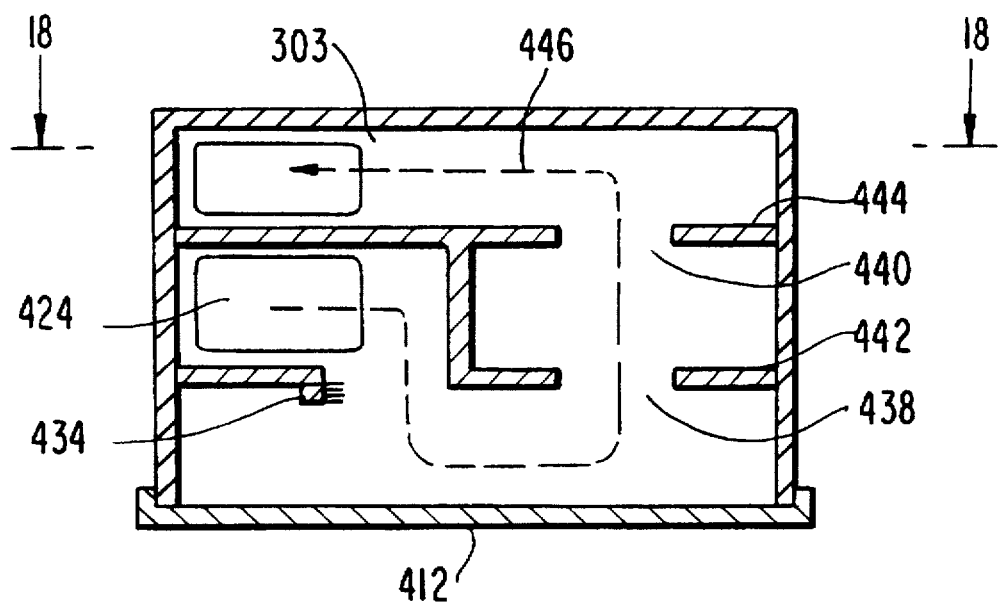
FIG. 17 is a cross-sectional view taken along the line 17—17 of FIG. 16.
Figure 18:
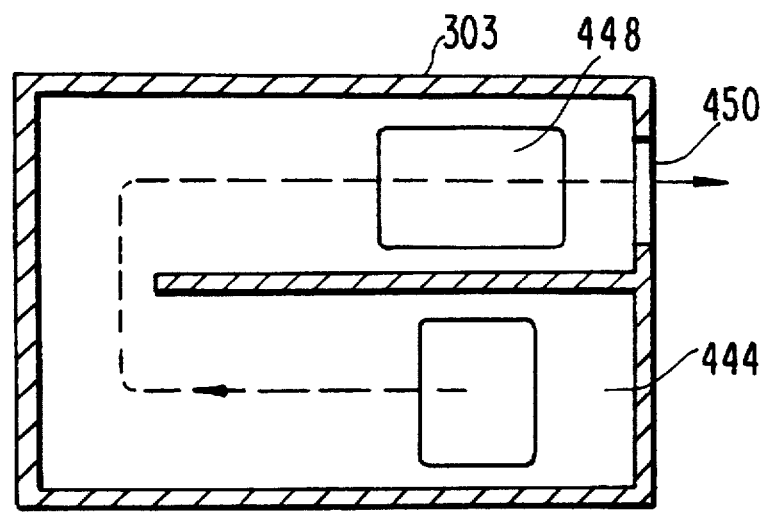
FIG. 18 is a cross-sectional view taken along the line 18—18 of FIG. 17.
Figure 19:
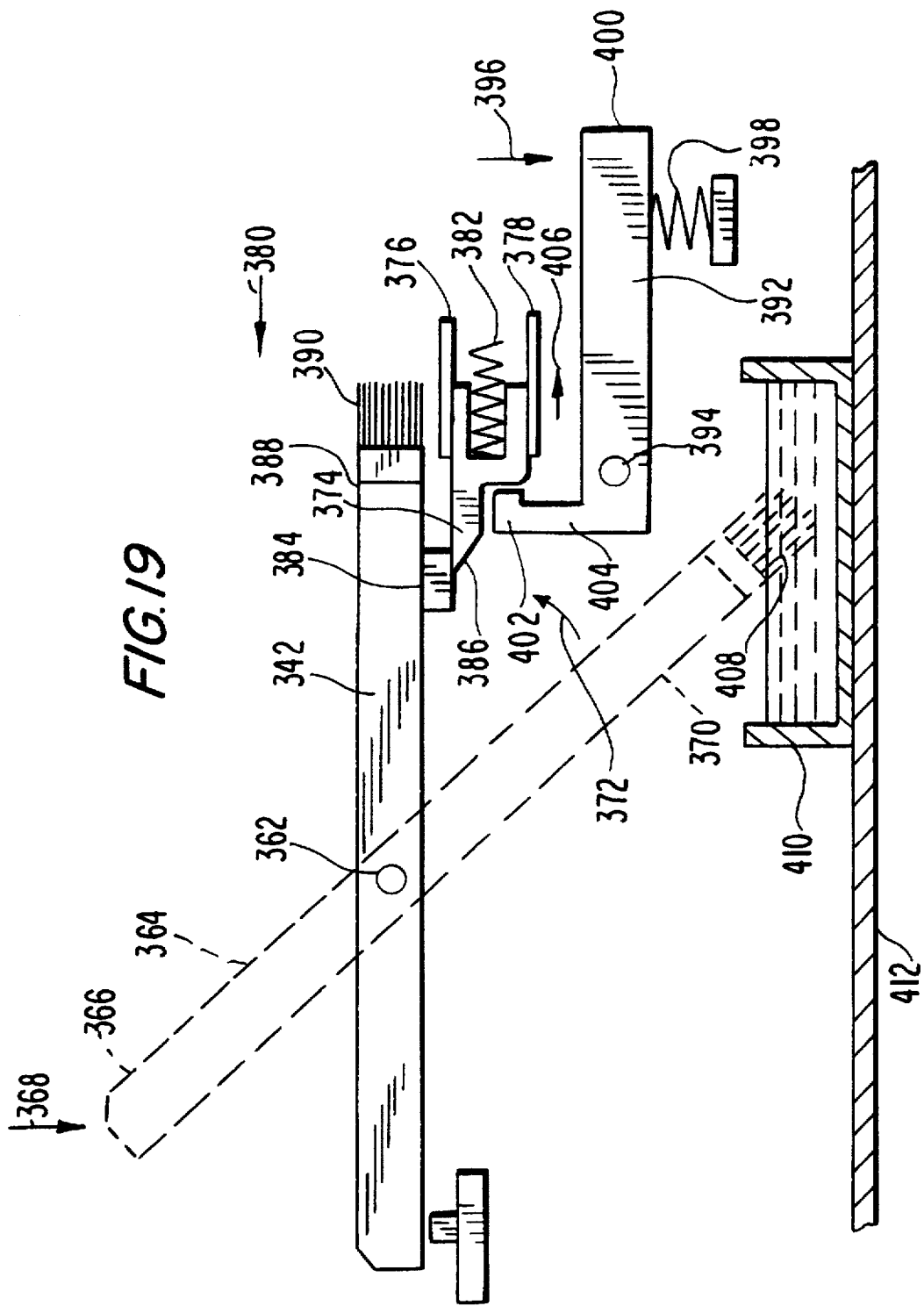
FIG. 19 is a fragmentary cross-sectional view similar to FIG. 15 showing the operating elements of the apparatus drawn to an enlarged scale, in schematic form.
Figure 20:
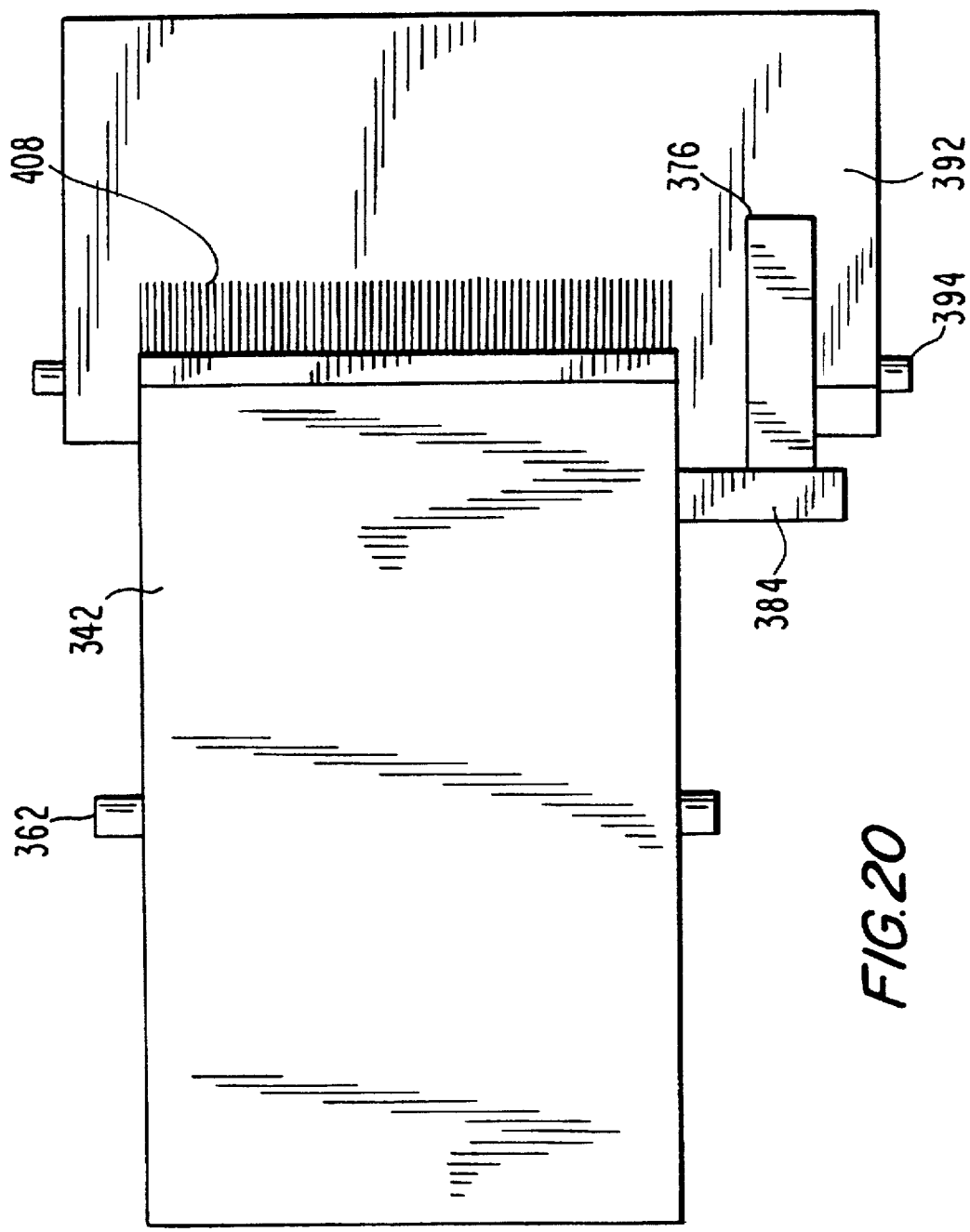
FIG. 20 is a plan view of the operating elements of the apparatus shown in FIG. 19.
Figure 21:
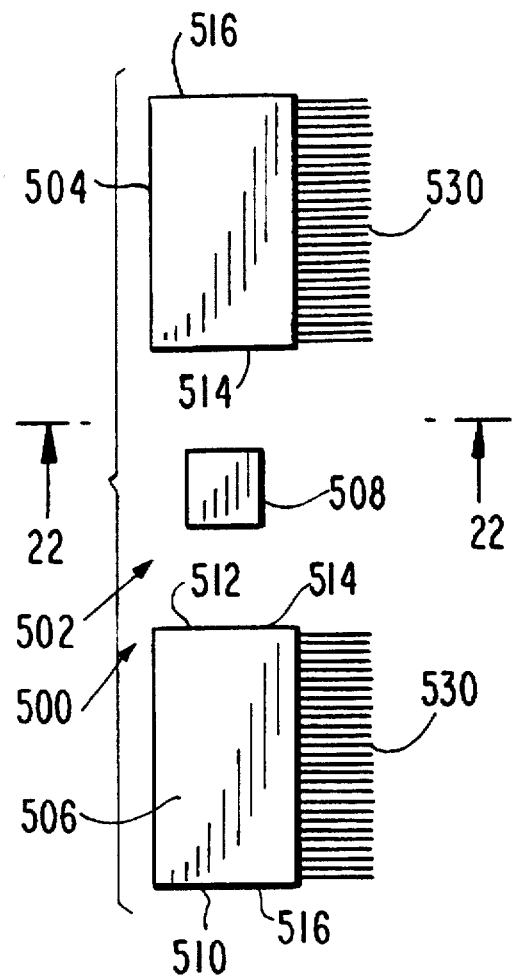
FIG. 21 is an exploded plan view showing another alternative embodiment of the apparatus of FIG. 1.

The path of the animal is constrained by the panels 422, 426 428 and the walls 423 as shown in FIG. 15. The animal continues along the path shown in broken lines 430 in FIG. 16 and jumps down through the opening 432 formed in the panel 428. A brush 434 is attached to the panel 428 with bristles 436 projecting into the opening 432 and serves to wipe the animal. The animal proceeds to walk on the bottom panel 412 as shown in FIG. 17 and then climb through the openings 438, 440 following the bath shown in broken lines 446 in panel 442, 444 and the upper panel as is best shown in FIG. 17. The animal continues to walk on the upper panel 444 and walks onto a pad 448 which may be in the nature of a rug in order to dry the animal's paws. The animal leaves the enclosure 303 via the opening 450 having had its body and paws washed.

The enclosure 303 of the washing assembly 302 is connected to the litter box by the hook and look fasteners 452 which allow the enclosure 303 and the litter box 304 to be separated from each other when desired.

Figure 22:
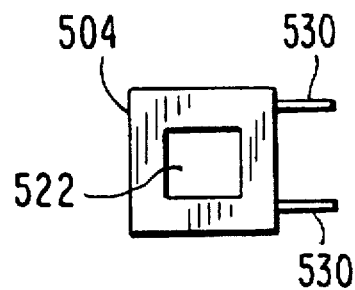
FIG. 22 is a view taken along the line 22—22 of FIG. 21.
Figure 23:
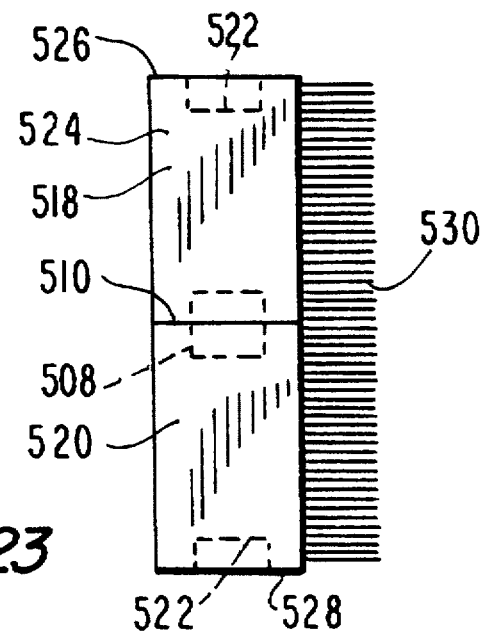
FIG. 23 is a plan view similar to FIG. 21 showing the apparatus in an assembled configuration.
Figure 24:
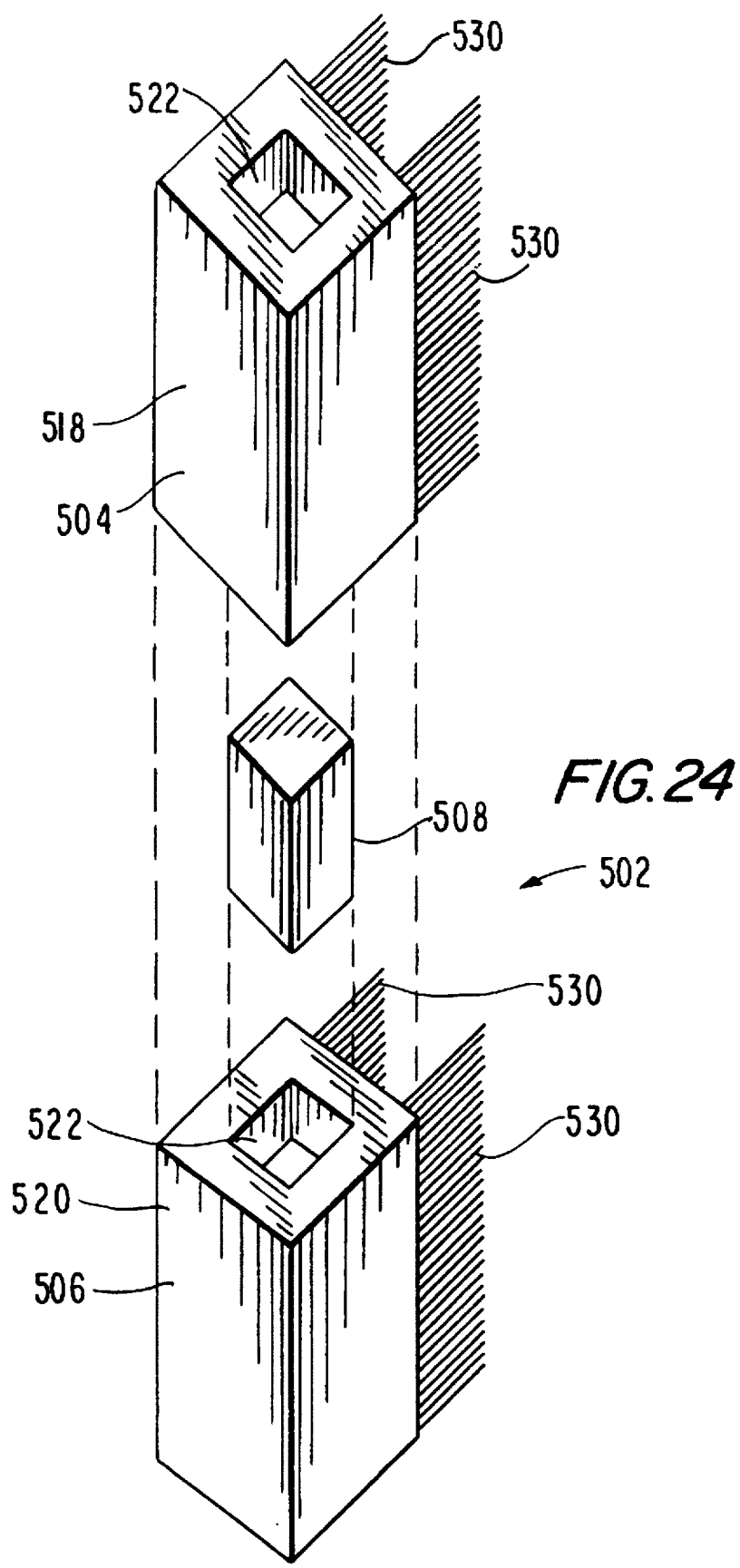
FIG. 24 is an exploded perspective view of the apparatus of FIG. 21.

FIGS. 21–24 show another embodiment of the invention 500 in which a brush assembly 502 is provided which has brush members 504, 506 and connectors 508 which can be assembled in an aligned manner. The brush members 504, 506 are similar to the brush members 104, 106 108, 110. Each of the brush members 504, 506 has receptacle portions 510, 512 on the ends 514, 516 of the base members 518, 520 as previously shown in FIG. 8. The brush members 504, 506 each have bristles 530. As is best shown in FIGS. 22 and 24, the receptacle portions 510, 512 have square or rectangular cavities 522.

Figure 6:
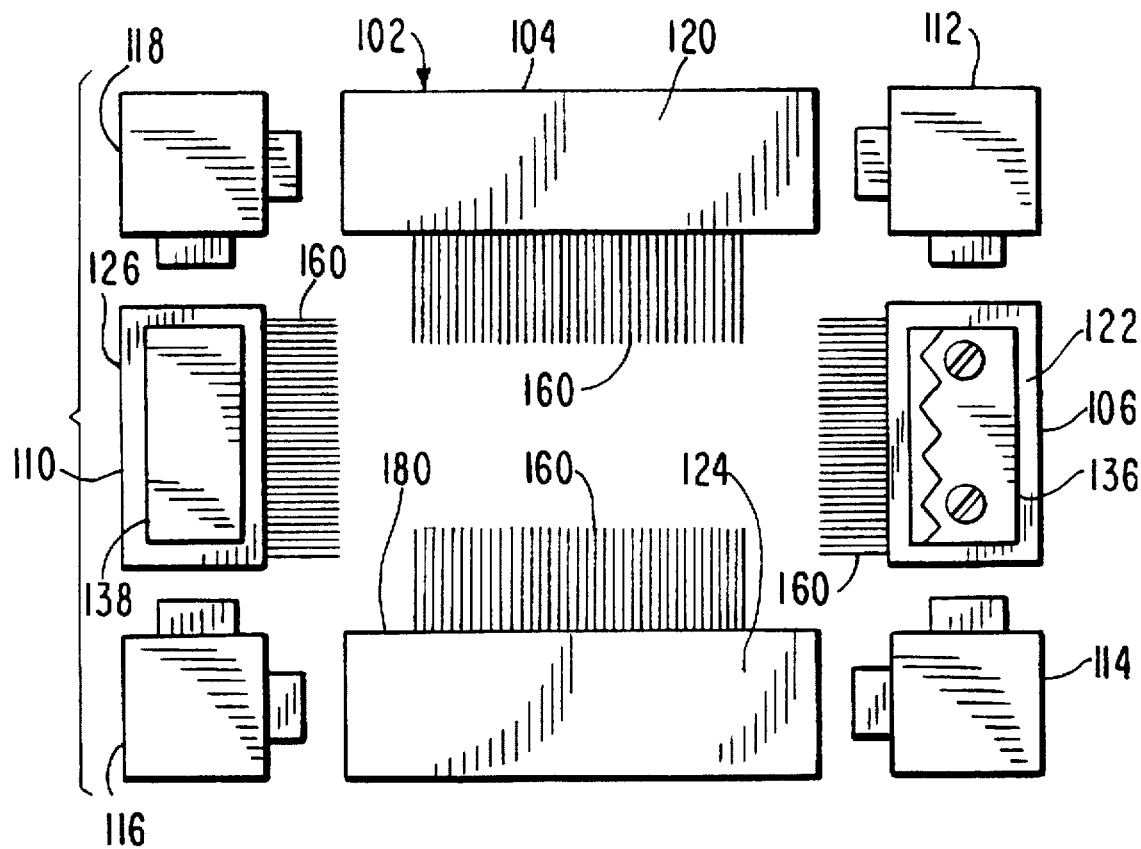
FIG. 6 is an exploded view of the brush portion of the apparatus of FIG. 5.

The connector members 508 removably fit into the cavities 522 thereby allowing the brush members 504, 506 to be assembled as a single elongated brush member 524. Although only two brush members 504, 506 have been shown in FIGS. 23 and 24, it should be understood that additional brush members each identical to the brush members 504, 506 may be provided to result in an elongated brush member of any length desired. The ends 526, 528 of the elongated brush member 524 may be connected using the connector members 112, 114 as shown in FIGS. 6 and 7 thereby allowing the brush members 504, 506 to be configured to match the size of various size openings in various size litter boxes.

The foregoing specific embodiments of the present invention as set forth in the specification herein are for illustrative purposes only. Various changes and modifications may be made within the spirit and scope of this invention.

What is claimed is:

1. A litter box apparatus for an animal comprising:

an enclosure including a front panel, a rear panel, a pair of side panels, a bottom panel and a top panel, with said front panel including an aperture for entry and exit for an animal;

fastener means mounted on said front panel;

a first brush means with said first brush means comprising a first base member and a plurality of bristles and first fastener means mounted on said first base member, with said first fastener means cooperating with said fastener means on said front panel to attach said first brush means to said front panel with said bristles projecting into said aperture for grooming an animal entering or leaving said enclosure;

a second brush means with said second brush means comprising a base member and a plurality of bristles and fastener means mounted on said second base member, with said second fastener means cooperating with said fastener means on said front panel to attach said second brush means to said front panel with said bristles projecting into said aperture;

a third brush means with said third brush means comprising a third base member and a plurality of bristles and third fastener means mounted on said third base member, with said third fastener means on said third brush means cooperating with said third fastener means on said front panel to attach said third brush means to said front panel with said bristles projecting into said aperture;

a fourth brush means with said fourth brush means comprising a fourth base member and a plurality of bristles and fourth fastener means mounted on said base member with said fastener means on said fourth brush means cooperating with said fastener means on said front panel to attach said fourth brush means to said front panel with said bristles projecting into said aperture;

four removal connector means connecting each of said four brush means to form a rectangular frame having two of said four brush means vertically disposed and two of said four brush means horizontally disposed, with each of said vertically disposed brush means connected to said front panel.

2. A cleaning and grooming apparatus for mounting on a door having an aperture formed therein comprising:

a support member having an aperture;

fastener means for attachment of said support member on said door with said aperture ins aid support member in general registry with said aperture formed in said door;

a sponge member having an aperture mounted on said support member with said aperture in said sponge member in registry with said aperture in said support member;

liquid container means mounted on said support member for storage of liquid and dispensing of liquid onto said sponger member;

fastener means mounted on said door adjacent to said aperture formed in said door; and at least one brush means with said brush means comprising a base member and a plurality of bristles with said fastener means mounted on said door attaching said brush means with said bristles projecting into said aperture for the purpose of grooming an animal entering or leaving through said aperture in said door while said sponge member dispenses liquid onto the animal.

3. A litter box apparatus for an animal comprising:

an enclosure including a front panel, a rear panel, a pair of side panels, a bottom panel and a top panel, with said front panel including an aperture for entry and exit for an animal;

fastener means mounted on said panel;

at least one brush means with said brush means comprising a base member and a plurality of bristles;

fastener means mounted on said base member of said brush means, with said fastener means on said brush cooperating with said fastener means on said front panel to attach said brush means to said front panel with said bristles projecting into said aperture for grooming an animal entering or leaving said enclosure;

a support member having an aperture;

fastener means for attachment of said support member to said front panel proximate to said brush means;

a sponge member having an aperture mounted on said support member and liquid container means mounted on said support member for storage of liquid and dispensing of liquid onto said sponge member, with said aperture in said sponge member, said aperture on said support member and said aperture on said front panel of said enclosure of general registry thereby allowing said sponge member to apply liquid to an animal entering or leaving said enclosure.

4. A litter box apparatus according to claim 3 in which said fastener means mounted on said front panel comprises adjustable fastener means.

5. A litter apparatus according to claim 3 in which said fastener means mounted on said front panel comprises hook and loop fastener means.

6. A litter box apparatus according to claim 3 in which said base member comprises a step portion.

7. A litter box apparatus according to claim 6 in which said base member comprises a pair of step portions.

8. A litter box apparatus according to claim 3 further comprising a washing assembly with said washing assembly comprising:

attachment means for attachment of said washing assembly to said enclosure a washing assembly enclosure having an entrance aperture proximate to said rear panel of said enclosure and with said rear panel of said enclosure having an aperture in registry with said entrance aperture pivotally mounted washing brush means disposed in said washing assembly enclosure and capable of an upper and a lower position a first pan containing cleaning liquid disposed in said washing assembly enclosure, with said pivotally mounted washing brush means normally in said lower position in which said brush means projection to said first pan of cleaning liquid and with said pivotally mounted washing brush means capable of pivoting to said upper position responsive to being stepped on by an animal latch means disposed to maintain said brush means in said upper position trigger means mounted below said brush means and disposed to release said brush means to pivot to said lower position under the influence of gravity thereby allowing said brush means to wipe the body of an animal as the animal passes the brush means.

9. A litter box apparatus according to claim 3 further comprising:

a plurality of brush means; and connector means capable of connecting said plurality of brush means to form an elongated brush member.

10. A litter box apparatus for an animal comprising:

an enclosure including a front panel, a rear panel, a pair of side panels, a bottom panel and a top panel, with said front panel including an aperture for entry and exit for an animal;

fastener means mounted on said front panel;

at least one brush means with said brush means comprising a base member and a plurality of bristles;

fastener means mounted on said base member of said brush means, with said fastener means on said brush cooperating with said fastener means on said front panel to attach said brush means to said front panel with said bristles projecting into said aperture for grooming an animal entering or leaving said enclosure;

a washing assembly with said washing assembly comprising:

attachment means for attachment of said washing assembly to said enclosure;

a washing assembly enclosure having an entrance aperture proximate to said rear panel of said enclosure and with said rear panel of said enclosure having an aperture in registry with said entrance aperture;

pivotally mounted washing brush means disposed in said washing assembly enclosure and capable of an upper and a lower position;

a first pan containing cleaning liquid disposed in said washing assembly enclosure, with said pivotally mounted washing brush means normally in said lower position in which said brush means projection to said first pan of cleaning liquid and with said pivotally mounted washing brush means capable of pivoting to said upper position responsive to being stepped on by an animal;

latch means disposed to maintain said brush means in said upper position;

trigger means mounted below said brush means and disposed to release said brush means to pivot to said lower position under the influence of gravity thereby allowing said brush means to wipe the body of an animal as the animal passes the brush means.

11. A litter box apparatus according to claim 10 further comprising a second pan containing washing liquid disposed proximate to said trigger means for washing the paws of an animal.

12. A litter box apparatus according to claim 10 further comprising undated member means disposed in said second pan with said undulated member means disposed to be stepped on by an animal entering said second pan and causing a spreading of the animal's toes thereby facilitating washing.

13. A litter box apparatus according to claim 10 further comprising a second brush mounted in said washing assembly enclosure, passageway means for control of the path of an animal leaving said pivotally mounted washing brush and constraining the animal to bear against and pass said second brush for additional cleaning.

14. A litter box apparatus according to claim 13 further comprising absorbent pad means disposed in said passageway means proximate to said second pan for the purposes of drying the paws of an animal.

15. A litter box apparatus according to claim 10 further comprising one-way door means allowing entry of an animal into said enclosure and preventing existing of an animal through said aperture in said front panel of said enclosure thereby forcing the animal to enter said washing assembly.

* * * * *